3,372,880
PROCESS FOR THE PRODUCTION OF POLYMER POWDER
Kim L. O'Hara, Odessa, Tex., assignor to Rexall Drug and Chemical Company, Los Angeles, Calif., a corporation of Delaware
Filed Apr. 14, 1966, Ser. No. 542,559
5 Claims. (Cl. 241—30)

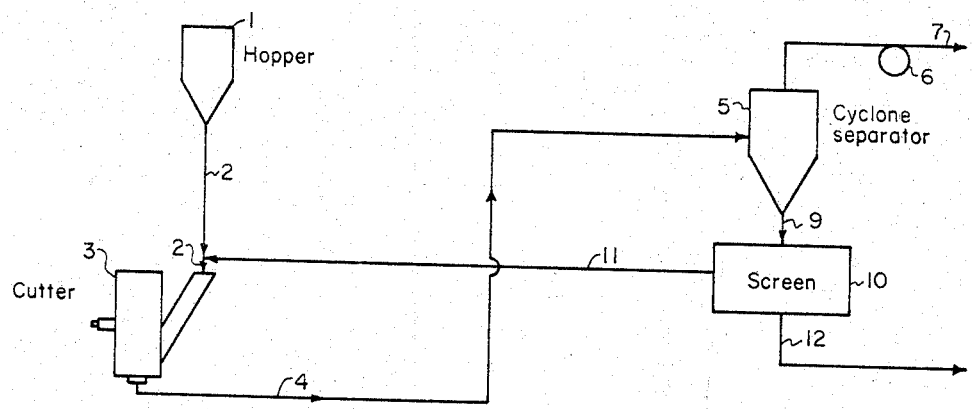
*FIG. 1*
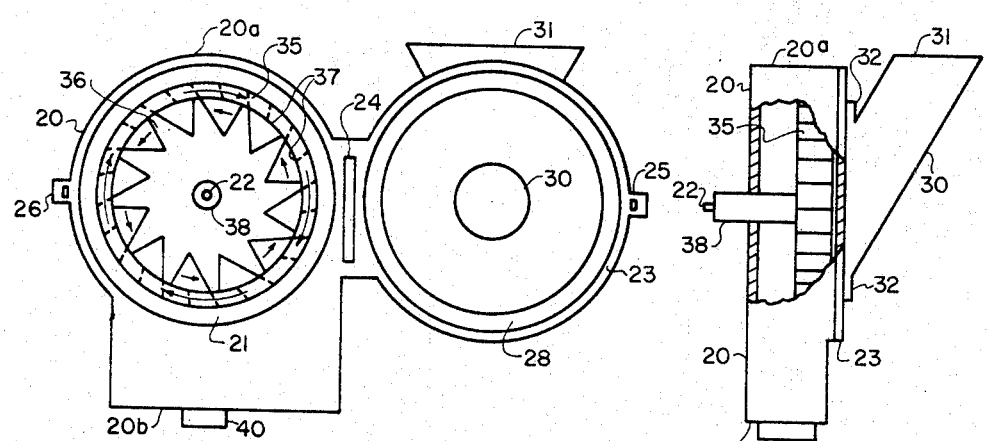
*FIG. 2*  *FIG. 3*

This invention relates to a process for producing a powder from substantially crystalline thermoplastic pellets.

Demand for thermoplastic polymers in their powdered form is increasing rapidly with the development of numerous applications for the powder. Examples of such applications include rotational and similar types of moldings, carpet backings and fluidized bed and frame sprayed coatings. Thermoplastic powder is also used as binders, additives, fillers and thickeners and in the preparation of monofilament and multi-filament fiber.

Thermoplastic polymers are usually in the form of pellets which must be reduced in size by a suitable process to produce powder suitable for these applications. A small portion of the thermoplastic polymers are available in a powdered form without resorting to such a process. However, this powdered material has a non-uniform particle size and requires costly classification procedures to produce a proper size for the above applications.

Previous attempts to produce a powder from thermoplastic polymer pellets have generally met with failure. For example, continuous grinding or pulverizing in turbine or hammer-type mills causes the thermoplastic polymer to become soft and to stick to the various parts of the mill equipment. This problem is somewhat alleviated by operating the grinding mill at very low rates. However, this greatly increases the cost of producing the powder. The prior art indicates other methods for producing thermoplastic powder, examples of which include (1) treating the polymer pellets with alcohol or cooling agent to embrittle the polymer and then grinding the pellets to a powder and (2) dissolving the pellets in solvent and cooling the solution to precipitate a powder. One disadvantage of the prior art methods for reducing the pellets to powder is they require difficult and expensive procedures. Another disadvantage is they produce a powder which contains a large amount of "fines." "Fines" is used herein to mean materials having a particle size of less than about 100 mesh. Such fines must be eliminated from the powder prior to use. Still another disadvantage is they either do no produce a powder of uniform particle size or else they require very expensive classification procedures to do so.

Powder having a very non-uniform particle size can be recovered directly from slurry polymerization processes. For example, a polypropylene powder recovered from a slurry polymerization process (see U.S. Patent No. 3,225,021) has an average particle size in the range from about 40 to 200 mesh with a significant portion greater than 40 mesh and less than 200 mesh. Average particle size or average particle diameter is used herein to mean the diameter of a hypothetical particle of a size such that one-half of the powder is smaller in particle size and one-half is larger than the hypothetical particle. This non-uniform powder must be classified and reclassified to obtain a powder suitable for the applications enumerated above. The resulting classified powder is only a small fraction of the total polymer from the slurry process and still is found to contain fines.

In addition to the problems enumerated above, attempts at grinding polypropylene to the desired uniform size resulted in deterioration and decomposition from the heat generated by the usual grinding operation.

An object of this invention is to provide a process for producing a powder essentially without fines from thermoplastic pellets.

Another object of this invention is to provide a process for producing a powder having uniform particle size from pellets of a highly crystalline thermoplastic polymer.

Still another object of this invention is to provide a process producing powder from highly crystalline thermoplastic pellets such as polypropylene at very high rates without the problems usually associated with previous attempts to produce polypropylene powder.

In accordance with the present invention, there is provided a process for producing a powder from substantially crystalline thermoplastic pellets comprising continuously applying and maintaining a shearing force to the pellets and recovering a powder containing no more than 35 weight percent oversized material having a particle size of greater than 20 mesh and no more than 1 weight percent fines.

Thermoplastic pellets suitable for the process of this invention have a particle size of at least 10 mesh and generally have as their largest dimension particles in the range of about 1/16-inch to 1/4-inch (approximately 10 to 3 mesh). Pellets of this size are readily avialable in industry. Thermoplastic polymers having a crystallinity of at least 60 percent as determined by X-ray analysis are suitable for the process of this invetnion. These polymers include polyethylene, polypropylene and polymers of alpha-olefins having from 4 to 8 carbon atoms such as butene-1, pentene-1, hexene-1 and copolymers thereof. Crystalline polypropylene is the most preferred thermoplastic polymer for use in the process of this invention.

It has been found that when a thermoplastic pellet such as a highly crystalline polypropylene is cut with a suitable shearing force, the pellet is reduced to its powdered form. This unique result is believed to depend in part on the highly crystalline nature of the pellet. One method for applying such a force includes providing and maintaining a uniform clearance between a portion of an impelling surface and at least one cutting surface, urging the pellets by means of the impelling surface against the cutting surface nearest to the impelling surface, and shearing the pellets by means of the cutting surface. The process of this invention reduces the pellets at ambient temperatures to a uniform powder having a particle size substantially all within the range of about 20 to 60 mesh without appreciable increase in the temperature of the pellets and without the production of fines. The sheared material is then screened to remove the oversized material which can be recycled to the shearing step and a powder is recovered which has an average particle size within the range of about 20 to 40 mesh and contains no more than 1 weight percent fines.

Highly crystalline polypropylene pellets having a particle size of at least 10 mesh are preferably used in the process of this invention to produce the desired powder. A suitable process for producing such highly crystalline polypropylene pellets is described in detail in U.S. Patent No. 3,225,021. Briefly the process comprises polymerizing propylene in the presence of an inert diluent and a titanium chloride-aluminum alkyl catalyst at a suitable temperature and pressure, removing from the polymerization step a slurry containing the polymer, unreacted monomer and the diluent, separating the polymer from the volatile materials in the slurry, deashing the polymer to remove catalyst residues and other impurities, and drying the polymer from the deashing step. The dried polypropylene in the form of a very non-uniform powder as described above is then extruded and cut into pellets varying from about 1/16 to 1/4 inch in diameter.

The present invention will be more readily understood and the further advantages thereof will be more readily apparent from the following description when read in conjunction with the accompanying figures in which:

FIG. 1 is a process flow diagram of units and flow paths suitable for carrying out the process of this invention.

FIG. 2 is a plan view of the front of a suitable device for shearing the pellets; and FIG. 3 is a plan view of one side of a suitable device for shearing the pellets, with a cut-away view of the internals of the device.

Referring now to FIG. 1, polymer pellets in hopper 1 are passed via line 2 into cutter 3 designed to shear the pellets. The temperature in the cutter is at ambient temperature, i.e. about 20° C. There is no significant temperature increase during the shearing operation. The sheared pellets are removed from the bottom of cutter 3 through line 4 to cyclone separator 5 by means of a vacuum produced by fan 6. Cyclone separator 5 is designed to separate the sheared pellets from the air used to carry the material from cutter 3. Separator 5 is operated at less than 1 atmosphere. Air and a small amount of dust of less than about 50 microns (about 275 mesh) in size are passed through line 7 and removed from the system. Substantially all of the sheared material from cutter 3 is passed from the bottom of separator 5 through line 9 to screen 10. Cyclone separator 5 is merely one suitable means for conveying solids from cutter 3 to screen 10. Other solids conveying means can be used including dropping the material from cutter 3 to screen 10 by gravity. The oversized material having a particle size of greater than 20 mesh is separated from the desired powder and recycled through line 11, combined with pellets in line 2 and passed to cutter 3. The oversized material can be recycled pneumatically or mechanically, e.g., by means of a screw conveyor or elevator (not shown). The powder having an average particle size of about 20 to 40 mesh is removed from screen 10 through line 12 and passed to product storage.

Referring now to FIG. 2 and FIG. 3, two views of cutter 3 suitable for producing the desired powder are shown. Cutter 3 comprises housing 20 having a curved upper section 20a and flat lower section 20b. Circular rim 21 on housing 20 forms the main opening to the housing 20 internals. The center of this opening is in horizontal alignment with knife ring shaft 22 disposed along a horizontal axis of housing 20.

Cover plate 23 is mounted on housing 20 by hinge 24. Cover plate 23 is provided with latch 25 to fasten plate 23 to housing 20 with catch 26. An air tight seal is provided between rim 28 on cover plate 23 and rim 21 on housing 20 when plate 23 is in its latched position. Inlet 30 has open end 31 suitable to receive the pellets and flanged end 32 connected to cover plate 23. Inlet 30 is designed to convey the pellets from an outside source (not shown) into the center of the internals of housing 20.

The housing 20 internals comprise knife ring 35 and impeller 36. Knife ring 35 is rotatably mounted on shaft 22 and comprises a plurality of adjustable knife blades 37. Knife blades 37 are adjustably mounted on knife ring 35 so that their cutting surfaces are extendable away from the inner surface of knife ring 35 toward shaft 22. Impeller 36 is concentric to knife ring 35 and rotatably mounted on impeller shaft 38. Shaft 38 is journaled about shaft 22 for movement counter to the movement of shaft 22. One end of knife ring shaft 22 extends through housing 20 and is operably connected to suitable drive means (not shown) to impart clockwise motion to knife ring 35. One end of impeller shaft 38 also extends through frame 20 and is operably connected to the same or other suitable drive means (not shown) to impart counterclockwise motion to impeller 36. Outlet 40 is disposed in lower section 20b for removing the powder from cutter 3.

The description of the process of the present invention has included a detailed description of a commercially available device suitable for producing powder at a very high rate from the thermoplastic pellets. This device is merely one such device and should not be construed as the only device suitable for the process of this invention. Another cutter which can be used comprises a rotating knife ring having a plurality of cutter surfaces, an impeller adjacent to the knife ring for urging the pellets against one of the cutting surfaces, and a suitable pellet feeding device situated above the knife ring and impeller to provide a continuous supply of pellets to the cutter. It is preferred that the impeller revolves in a direction counter to that of the knife ring, although the impeller can remain stationary. The knife ring for this cutter can be of any cylinder or similar device having a substantially circular cross section comprising a plurality of cutting surfaces extending outward from the surface of the ring and suitable for either clockwise or counterclockwise movement. The impeller can be a cylinder or device similar to that used for the knife ring. The impeller can either have a smooth surface or contain raised elements to aid in forcing the pellets to contact the cutting surface of the knife ring. A feeding device, in its more simpler form, can be a box having a flat bottom with a small opening for pellets to pass through. The box should be so positioned to place the pellets under the influence of the impeller and to prevent pellets from movement away from the cutting surfaces of the knife ring. The cutting surfaces should be adjustable so as to maintain uniform clearance between at least one cutting surface and a portion of the impeller and to allow only shear pellets of a specific size to pass through to the cutter outlet and hence to the screen.

The cutting devices discussed above produce a powder having a very uniform particle size substantially all within the range of about 20 to 60 mesh. Essentially no material under 100 mesh is produced because particles in the 20 to 60 mesh range pass between the knife blades or cutting surfaces and the impeller without further shearing.

The following example further illustrates the continuous process for producing a powder from polypropylene pellets by a process scheme similar to that shown in the attached drawing.

*Example*

In a continuous run, 2400 pounds per hour of polypropylene pellets having a crystallinity of over 90% and having a diameter of about 3/32 inch were fed at about 20° C. to cutter 3. The gap between impeller 36 and knife blades 37 of cutter 3 was adjusted to 0.06 inch and the knife ring setting was adjusted to 0.012 inch, i.e., the distance knife blades 37 extend from the inner surface of knife ring 35. The impeller was rotated at 1250 r.p.m. and the knife ring was rotated counter to the impeller at 1040 r.p.m. by an electric motor. The material was removed from cutter 3 and passed to screen 10. The oversized material having a particle size greater than 20 mesh was removed from screen 10. This material amounted to approximately 19 weight percent of the feed to cutter. The remaining powder was recovered and given a standard Tyler sieve analysis. The powdered polypropylene product from cutter 3 was found to have the following sieve analysis:

| Mesh size: | Percent |
|---|---|
| On 20 | 1.9 |
| On 40 | 85.7 |
| On 60 | 11.5 |
| On 100 | 0.7 |
| On 120 | 0.05 |
| In pan | 0.15 |
| | 100.00 |

The powdered material was found to be free-flowing by a standard funnel test. As indicated by the sieve analysis, the powder had substantially no fines and thus caused no dusting problem in subsequent applications. The powder had a melt flow index of 15 as measured by ASTM method D1238–57T at 230° C.

Thus it has been shown that the process of this invention yields a dust-free powder having a very uniform particle size suitable for use in numerous applications such as rotational molding and carpet backings.

What is claimed is:

1. A process for producing a powder from substantially crystalline thermoplastic pellets which comprises the steps of:
   (1) continuously applying and maintaining a shearing force to said pellets, and
   (2) recovering from step (1) a powder containing no more than 35 weight percent oversized material having a particle size of greater than 20 mesh and no more than 1 weight percent fines having a particle size of less than 100 mesh.

2. The process of claim 1 wherein said thermoplastic pellets are polypropylene and have a particle size of at least 10 mesh.

3. The process of claim 2 wherein said oversized material is recovered and recycled to step (1).

4. A continuous process for producing a powder from substantially crystalline polypropylene pellets having a particle size of at least 10 mesh which comprises the steps of:
   (1) providing and maintaining a uniform clearance between at least a portion of an impelling surface and at least one cutting surface,
   (2) urging said pellets with said impelling surface against said cutting surface,
   (3) shearing said pellets with said cutting surface with no appreciable increase in temperature of said pellets,
   (4) screening the sheared material from step (3),
   (5) recovering and recycling a minor portion of the screened mtaerial from step (4) having a particle size greater than 20 mesh to step (2) and,
   (6) recovering as a product from step (4) a powder having an average particle size within the range of about 20 to 40 mesh and containing no more than 1 weight percent fines having a particle size of less than 100 mesh.

5. The process of claim 4 wherein said thermoplastic pellets are at ambient temperatures.

No references cited.

HARRISON L. HINSON, *Primary Examiner.*